US007004535B1

(12) United States Patent
Osterberg et al.

(10) Patent No.: US 7,004,535 B1
(45) Date of Patent: Feb. 28, 2006

(54) ROOF DITCH MOLDING FASTENER

(75) Inventors: Gary Osterberg, Farmington Hills, MI (US); Rob Blanchard, Farmington Hills, MI (US); Youichi Yamamoto, West Bloomfield, MI (US)

(73) Assignee: Nissan Technical Center North America, Inc., MI (US)

( * ) Notice: Subject to any disclaimer, the term of this patent is extended or adjusted under 35 U.S.C. 154(b) by 0 days.

(21) Appl. No.: 11/003,525

(22) Filed: Dec. 6, 2004

(51) Int. Cl.
B60R 27/00 (2006.01)
(52) U.S. Cl. ................... 296/203.03; 296/210
(58) Field of Classification Search ................ 296/41, 296/93, 187.12, 203.03, 207, 209, 210
See application file for complete search history.

(56) References Cited

U.S. PATENT DOCUMENTS

| 4,168,858 A | | 9/1979 | Inamoto | |
|---|---|---|---|---|
| 4,618,181 A | * | 10/1986 | Tokuda et al. | 296/210 |
| 5,013,083 A | * | 5/1991 | Yada et al. | 296/210 |
| 5,829,825 A | * | 11/1998 | Kim | 296/210 |
| 6,510,662 B1 | | 1/2003 | Ichimaru | |
| 6,557,931 B1 | * | 5/2003 | Tremmel et al. | 296/210 |
| 6,568,748 B1 | * | 5/2003 | Yoon | 296/210 |
| 6,695,397 B1 | * | 2/2004 | Kamiya et al. | 296/210 |
| 6,709,048 B1 | * | 3/2004 | Nagashima et al. | 296/210 |
| 2002/0101096 A1 | * | 8/2002 | Nagasawa | 296/210 |
| 2002/0180246 A1 | * | 12/2002 | Nagashima et al. | 296/210 |

* cited by examiner

Primary Examiner—Lori L. Coletta
(74) Attorney, Agent, or Firm—Shinjyu Global IP Counselors, LLP

(57) ABSTRACT

A roof ditch molding fastener is provided that comprises a molding retaining portion and a base portion. The molding retaining portion is configured and arranged to releasably retain a roof ditch molding to a vehicle body. The base portion includes a first longitudinal contacting surface and a second longitudinal contacting surface. The second longitudinal contacting surface extends substantially parallel to the first longitudinal contacting surface, and is laterally spaced from the first longitudinal contacting surface to form an uninterrupted air space between the first and second longitudinal contacting surfaces. Thus, the roof ditch molding fastener is easily positioned in place with respect to the vehicle body by using the first and second longitudinal contacting surfaces. Moreover, since the uninterrupted space is formed between the first and second longitudinal surfaces, a corrosion of a portion between the roof ditch molding fastener and the vehicle body can be prevented.

30 Claims, 12 Drawing Sheets ated with the first longitudinal
ROOF DITCH MOLDING FASTENER

BACKGROUND OF THE INVENTION

1. Field of the Invention

The present invention relates to a roof ditch molding fastener. More specifically, the present invention relates to a roof ditch molding fastener configured and arranged to fixedly couple a roof ditch molding to a first pillar member of a vehicle body.

2. Background Information

U.S. Pat. No. 4,168,858 discloses one example of conventional molding fasteners configured and arranged to releasably retain a molding that covers a coupling portion between a windshield and a front pillar of a vehicle. The molding fastener disclosed in this reference includes a base member with a mounting surface that is adhesively mounted to the front pillar of the vehicle, and a leg portion extending from the base member that engages with a portion of the molding to hold the molding in place with respect to the first pillar member. The leg portion of the molding fastener has a generally round shape bottom surface that is disposed on the first pillar member of the vehicle. In such conventional molding fasteners, the bottom surface is not configured and arranged to assist positioning of the molding fastener with respect to the first pillar member of the vehicle when the molding fastener is installed. Thus, the molding fastener may be easily installed out of position with respect to the first pillar member, which causes a poor fit and poor finish of the molding. Moreover, since the bottom surface of the molding fastener disclosed in this reference provides a relatively larger contacting area with the first pillar member, the corrosion potential is increased in a part where the bottom surface contacts with the first pillar member.

U.S. Pat. No. 6,510,662 discloses another example of conventional molding fasteners that includes a base configured to be attached to a frame and a plurality of clip members that are assembled to the base. The base of the molding fastener disclosed in this reference is fixedly coupled to the frame by a plurality of bolts, and the clip members are attached to the base member to hold the molding in place. Since the base of the molding fastener is fixedly couple to the frame by the bolts, the leakage problem might occur at bolt insertion bores of the frame where the bolts are inserted. Moreover, since the molding fastener of this reference comprises two separator members, manufacturing cost and assembly cost are required to be increased.

In view of the above, it will be apparent to those skilled in the art from this disclosure that there exists a need for an improved roof ditch molding fastener that provides a self locating structure and an efficient water management structure. This invention addresses this need in the art as well as other needs, which will become apparent to those skilled in the art from this disclosure.

SUMMARY OF THE INVENTION

One object of the present invention is to provide a roof ditch molding fastener that provides a self locating structure that assists positioning the molding fastener with respect to a vehicle body member.

Another object of the present invention is to provide a roof ditch molding fastener that provides an efficient water management structure that prevents the corrosion in a contacting area between the roof ditch molding fastener and a vehicle body member.

Another object of the present invention is to provide a roof ditch molding fastener with a simple structure to reduce the manufacturing and assembling costs.

In order to achieve the above mentioned and other objects of the present invention, a molding fastener is provided that basically comprises a molding retaining portion and a base portion. The molding retaining portion is configured and arranged to releasably retain a roof ditch molding to a vehicle body. The base portion includes a first longitudinal contacting surface and a second longitudinal contacting surface. The second longitudinal contacting surface extends substantially parallel to the first longitudinal contacting surface, and is laterally spaced from the first longitudinal contacting surface to form an uninterrupted air space between the first and second longitudinal contacting surfaces.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
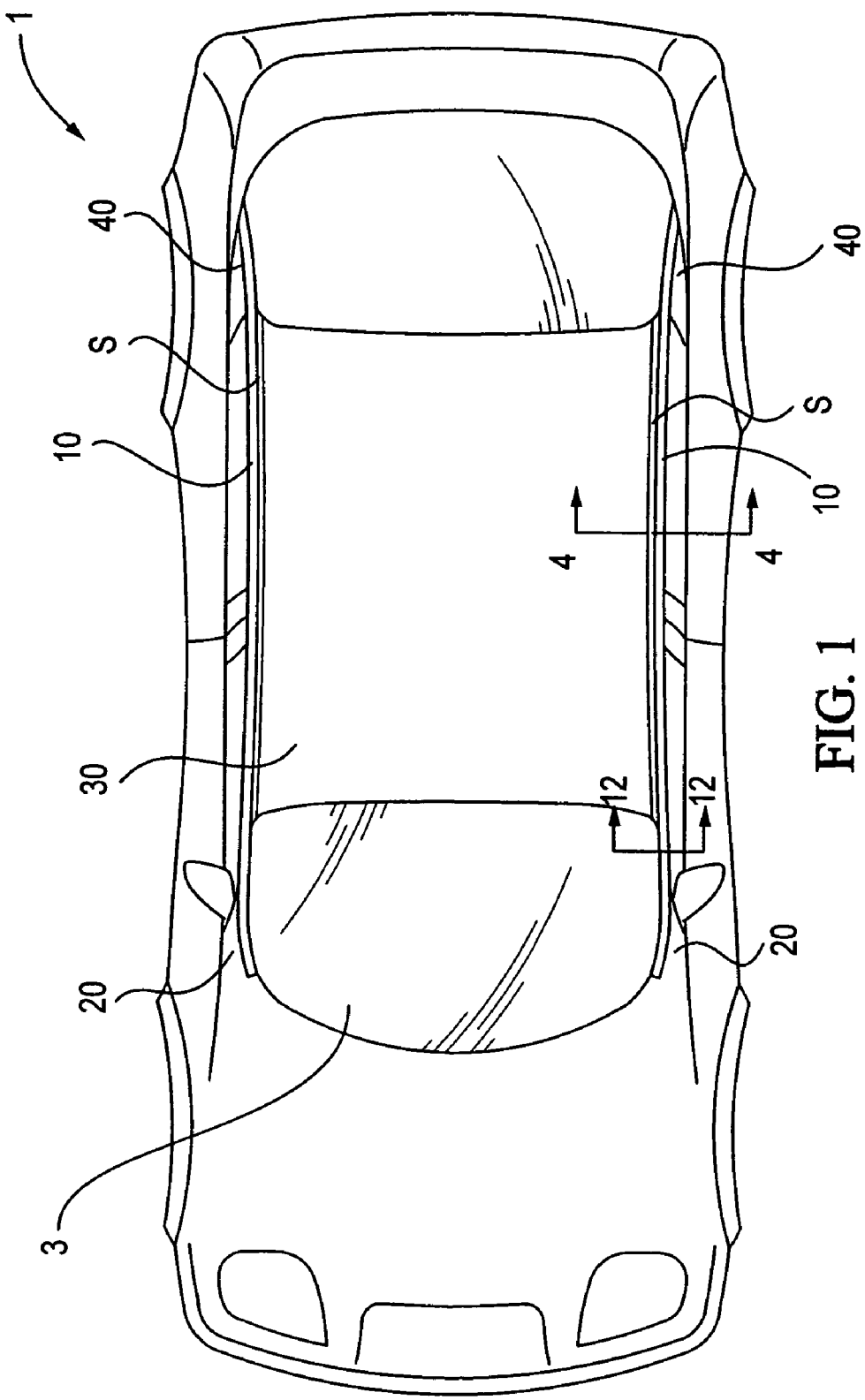
FIG. 1 is a top plan view of a vehicle with a pair of roof ditch molding coupled to the vehicle by using a roof ditch molding structure in accordance with a preferred embodiment of the present invention.

Referring initially to FIG. 1, a roof ditch molding structure of the present invention is illustrated in accordance with a preferred embodiment of the present invention. As seen in FIG. 1, a vehicle 1 is provided with a pair of roof ditch moldings 10 that extend in a generally longitudinal direction at left and right sides of the vehicle 1. More specifically, the left and right roof ditch moldings 10 preferably continuously extend from lower portions of left and right front pillars 20 along left and right side portions of a roof body member 30, to lower portions of left and right rear pillars 40, respectively, as seen in FIG. 1. In other words, each of the roof ditch moldings 10 preferably includes a roof molding section that longitudinally extends in the roof portion of the vehicle 1, a front pillar molding section integrally formed with the roof molding section to extend substantially parallel to the left or right front pillar 20, and a rear pillar molding section integrally formed with the roof molding section to extend substantially parallel to the left or right rear pillar 40. Each of the roof ditch moldings 10 is preferably configured and arranged such that the roof molding portion, the front pillar molding portion and the rear pillar molding portion of each of the roof ditch moldings 10 have a substantially constant transverse cross sectional shape, as discussed in more detail below.

Figure 3:
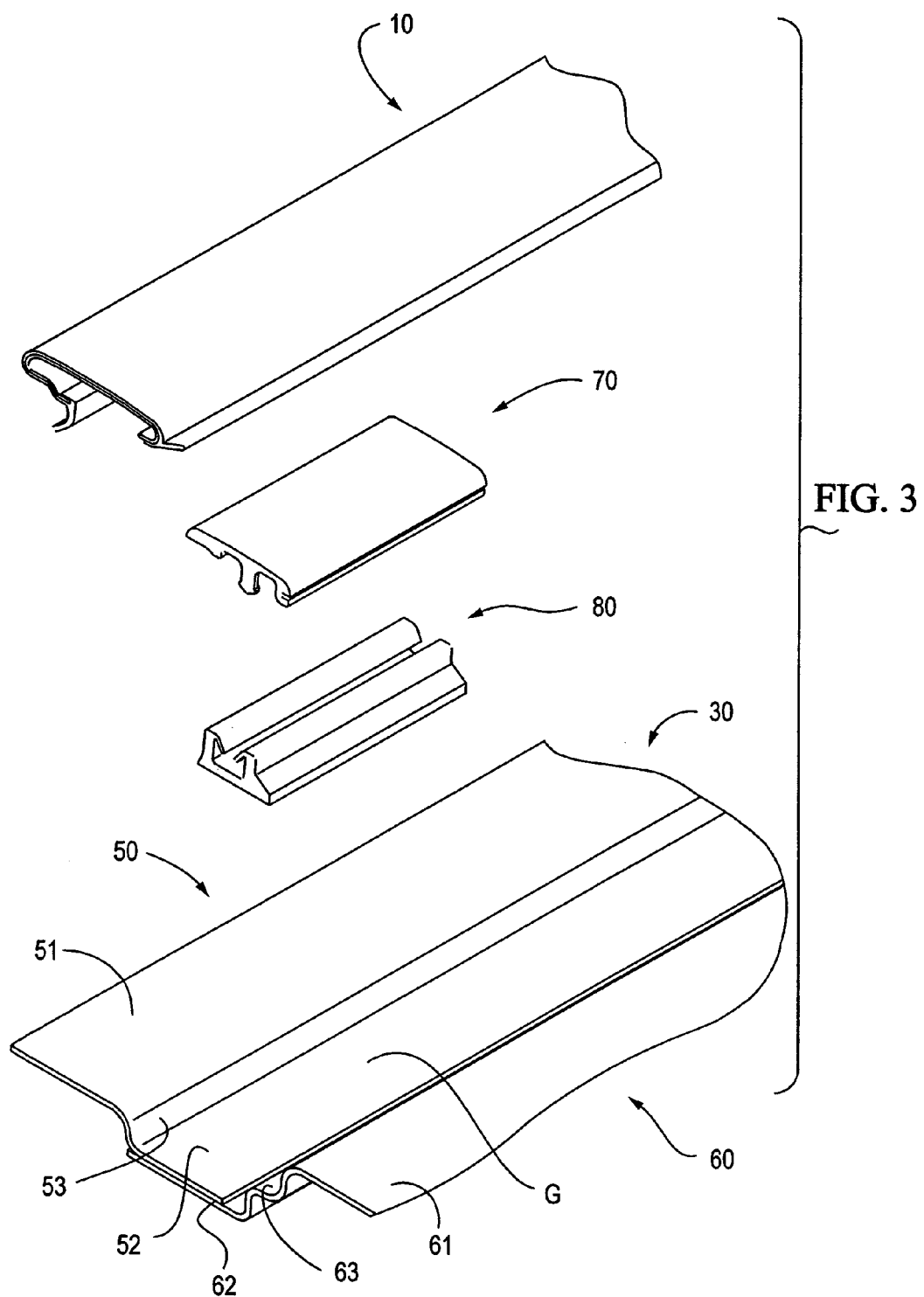
FIG. 3 is an enlarged exploded view of the roof ditch molding structure at a roof portion of the vehicle including a roof side molding clip and a roof side molding fastener in accordance with the preferred embodiment of the present invention.
Figure 4:
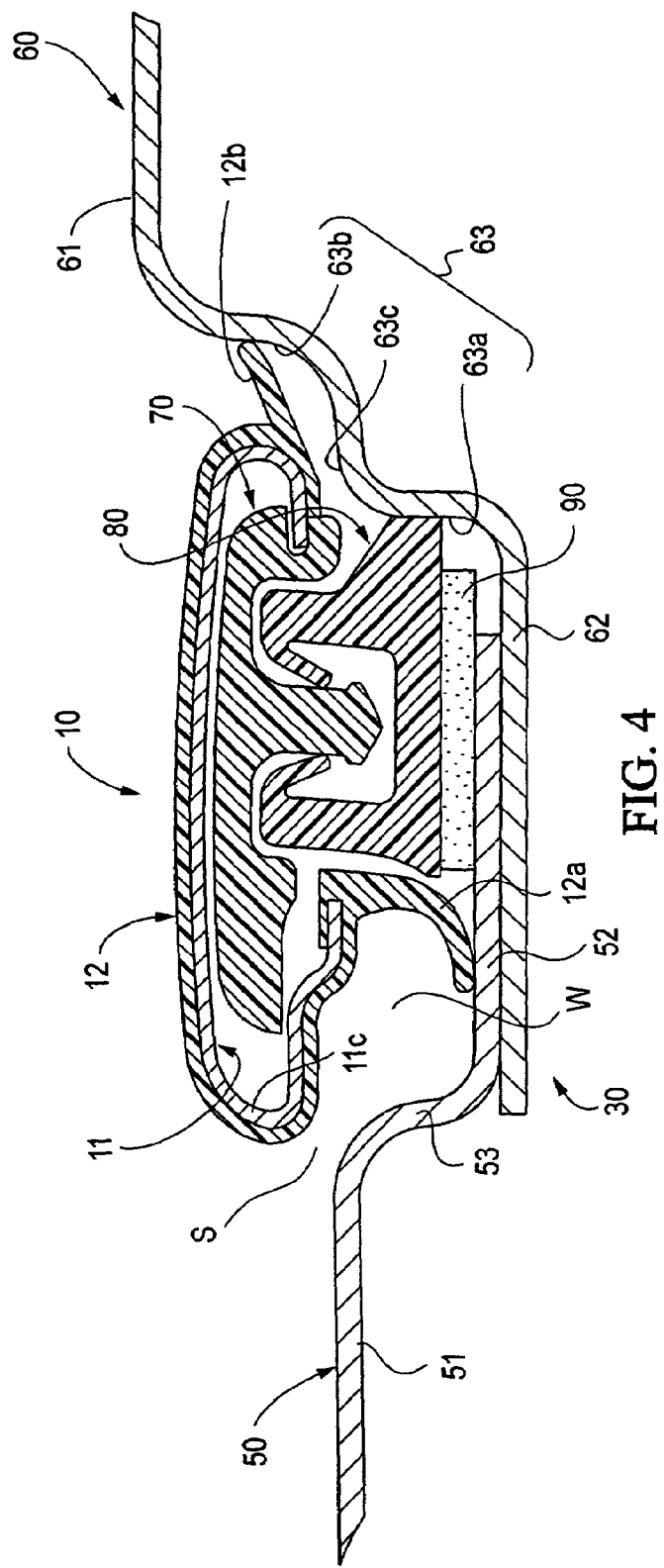
FIG. 4 is a cross sectional view of the roof ditch molding structure at the roof portion of the vehicle take along a section line 4—4 in FIG. 1 in accordance with the preferred embodiment of the present invention.

As seen in FIGS. 3 and 4, the left roof ditch molding 10 is installed in a generally U-shape drainage groove G that is formed in a left longitudinal edge portion of the roof body member 30 as discussed below. The, the right roof ditch molding 10 is installed in a generally U-shape drainage groove that is formed in a right longitudinal edge portion of the roof body member 30 in the same manner as left roof ditch molding 10. Thus, the left roof ditch molding 10 will be illustrated herein. When the left and right roof ditch moldings 10 are installed in the drainage grooves G (only the left one is shown), two longitudinal water inlet silts S are formed between the roof body member 30 and the corresponding one of the roof ditch molding 10 as seen in FIG. 1 and two water management channels W (only the left one is shown in FIG. 4) between the roof ditch moldings 10 and the roof body member 30 that are communicated with the water inlet slits S, respectively. Thus, the water on the roof of the vehicle 1 is effectively guided into the water management channels W disposed on the left and right side of the roof through the water inlet slits S.

Moreover, the roof ditch moldings 10 are preferably configured and arranged to extend from the roof of the vehicle 1 to the front pillars 20 and the rear pillars 40 such that the water collected in the water management channels W are drained down through the roof ditch moldings 10 extending along the front pillars 20 and the rear pillars 40 toward the lower portions of the front pillars 20 and the rear pillars 40. Thus, the roof ditch molding structure of the present invention provides an efficient water drainage system for the vehicle 1. Furthermore, an external appearance of the vehicle 1 is improved by the roof ditch moldings 10 that continuously extend along the front pillars 20, the roof body member 30, and the rear pillars 40. The left and right roof ditch moldings 10, the left and right front pillars 20, the left and right side portions of the roof body member 30, and the left and right rear pillars 40 are essentially identical to the corresponding counterparts except for that they are mirror images of each other. Thus, only the left roof ditch molding 10 and the roof ditch molding structure of the left side of the vehicle 1 will be discussed and/or illustrated in detail herein.

Figure 2:
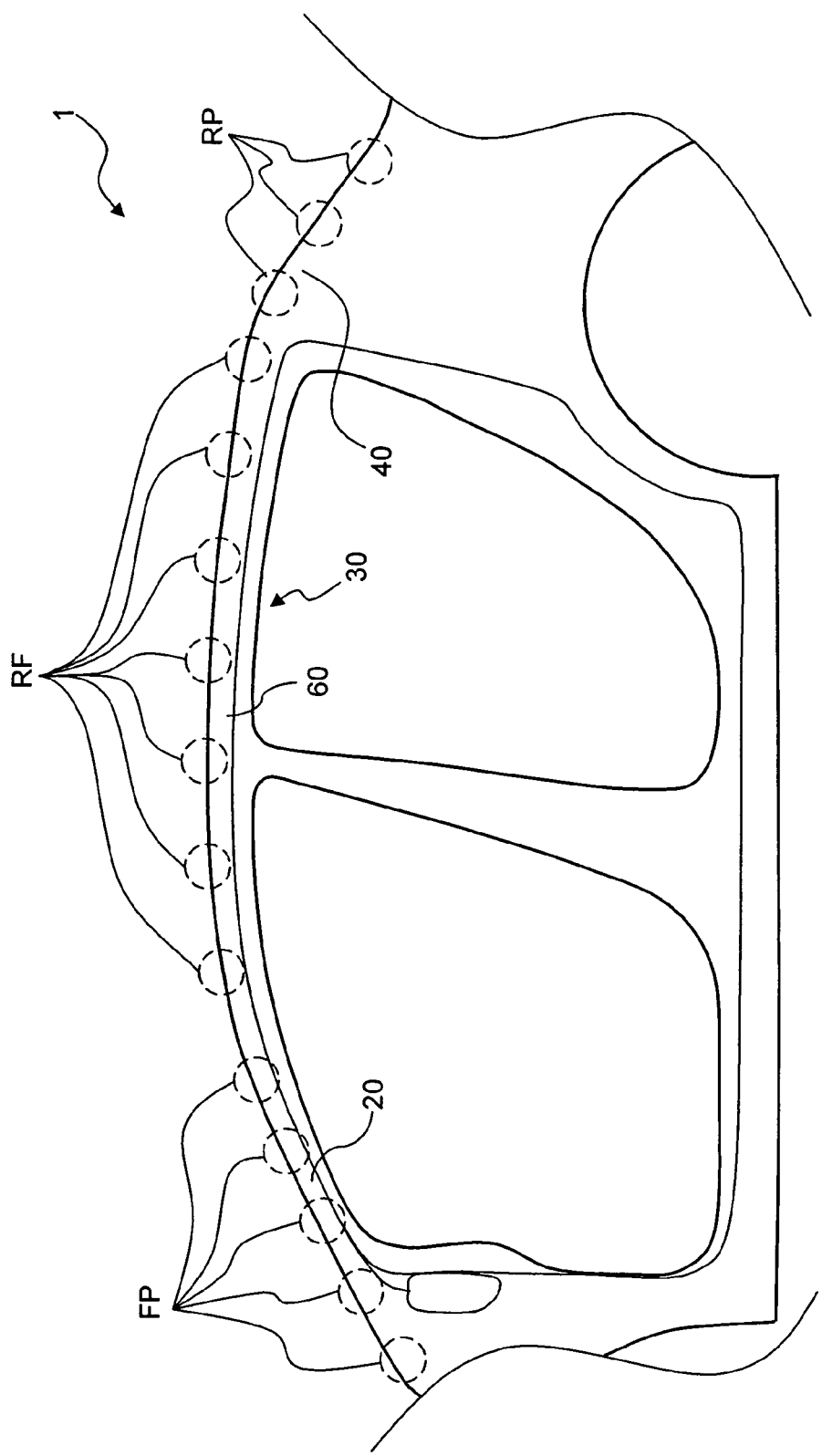
FIG. 2 is a partial left side elevational view of the vehicle illustrated in FIG. 1 showing locations in which the roof ditch molding is fixedly coupled to the vehicle using the roof ditch molding structure in accordance with the preferred embodiment of the present invention.

In the roof ditch molding structure of the present invention, the roof ditch molding 10 is preferably fixedly coupled to the vehicle 1 at a plurality of portions. More specifically, the roof molding section of the roof ditch molding 10 is preferably fixedly coupled to the roof body member 30 by a plurality of roof fastener units at a plurality of roof mounting portions RF shown in FIG. 2 (e.g., seven roof mounting portions RF). The front pillar molding section and the rear pillar molding section of the roof ditch molding 10 are preferably fixedly coupled to the front pillar 20 and the rear pillar 40, respectively, by a plurality of pillar fastener units at a plurality of front pillar mounting portions FP and a plurality of rear pillar mounting portions RP as shown in FIG. 2 (e.g., five front pillar mounting portions FP and three rear pillar mounting portions RP). Of course, it will be apparent to those skilled in the art from this disclosure that the number and the locations of the mounting portions RF, FP and RP are not limited to the one disclosed herein, and that the precise number and locations of the mounting portions RF, FP and RP can be varied based on various conditions such as the design of the vehicle and the like.

Referring now to FIGS. 3–10, the roof ditch molding structure will be explained that is used for coupling the roof molding section of the roof ditch molding 10 to the roof body member 30 in one of the roof mounting portion RF. As seen in FIGS. 3 and 4, the roof body member 30 preferably comprises a roof panel 50 that extends in a generally horizontal direction to form the roof of the vehicle 1, and a side panel 60 that forms a side portion of the vehicle 1. The roof panel 50 is preferably a rigid press-formed member that includes a roof main portion 51, a lateral roof edge portion 52, and a roof vertical portion 53. The roof edge portion 52 is disposed outwardly with respect to the roof main portion 51 and extends in a generally longitudinal direction of the vehicle 1. The roof vertical portion 53 preferably extends in a generally vertical direction between the roof main portion 51 and the roof edge portion 52 so that the roof edge portion 52 is downwardly offset from the roof main portion 51.

The side panel 60 is preferably a rigid press-formed member that includes a side outer portion 61, a lateral side edge portion 62 and a side vertical portion 63 as seen in FIGS. 3 and 4. The lateral side edge portion 62 is disposed inwardly with respect to the side outer portion 61 and extends in a generally longitudinal direction of the vehicle 1. The side vertical portion 63 extends in a generally vertical direction between the side outer portion 61 and side edge portion 62 such that the side edge portion 62 is downwardly offset from the side outer portion 61.

Moreover, as seen in FIG. 3, the side vertical portion 63 preferably includes a step structure having a first vertical wall surface 63a, a second vertical wall surface 63b, and a horizontal wall surface 63c. The horizontal wall surface 63c extends between an upper end of the first vertical wall surface 63a and a lower end of the second vertical wall surface 63b. As seen in FIGS. 3 and 4, the first vertical wall surface 63a, the second vertical wall surface 63b and the horizontal wall surface 63c of the side vertical portion 63 are arranged such that the first vertical wall surface 63a is disposed between the side edge portion 62 and the horizontal wall surface 63c in a transverse direction.

The roof panel 50 and the side panel 60 are preferably fixedly coupled together at the roof edge portion 52 of the roof panel 50 and the side edge portion 62 of the side panel 60 to form the generally U-shape drainage groove G between the roof panel 50 and the side panel 60. The drainage groove G extends in a generally longitudinal direction at a lateral edge portion on the roof of the vehicle 1. More specifically, when the roof edge portion 52 and the side edge portion 62 are coupled together, the roof vertical portion 53 and the side vertical portion 63 form a pair of side walls of the U-shape drainage groove G, and the roof edge portion 52 and the side edge portion 62 together form a bottom portion of the drainage groove G.

As seen in FIG. 4, the roof ditch molding 10 is preferably coupled substantially within the drainage groove G in a transverse direction such that the roof ditch molding 10 substantially covers a coupling portion between the roof edge portion 52 of the roof panel 50 and the side edge portion 62 of the side panel 60.

Figure 5:
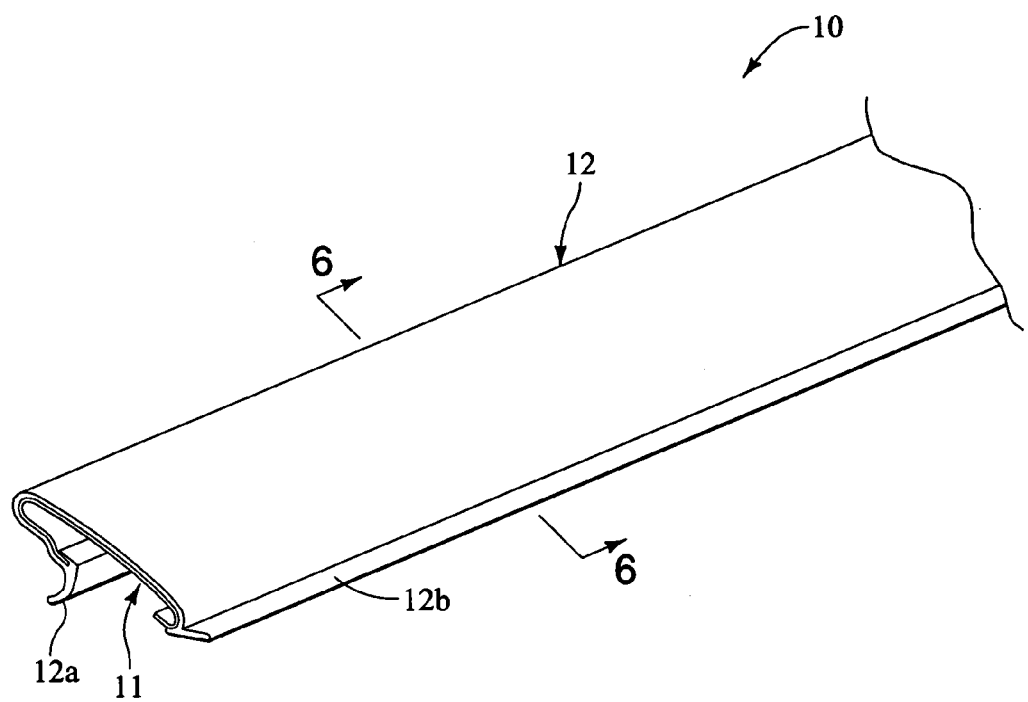
FIG. 5 is an enlarged partial perspective view of a roof ditch molding of the roof ditch molding structure in accordance the preferred embodiment of the present invention.
Figure 6:
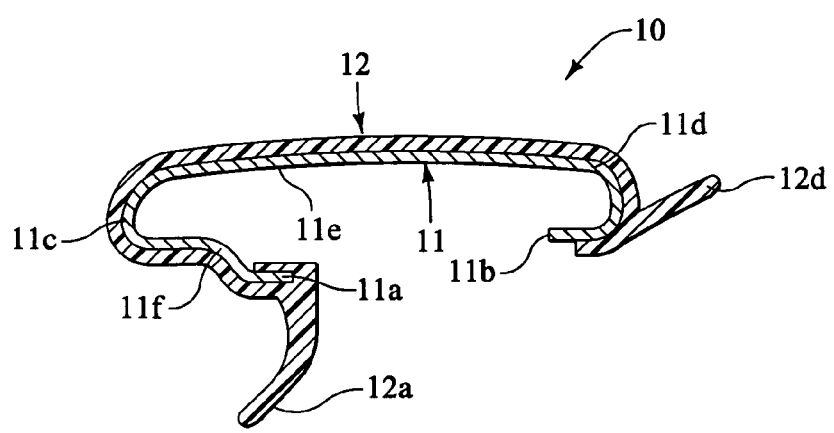
FIG. 6 is an enlarged cross sectional view of the roof ditch molding of the roof ditch molding structure in accordance with the preferred embodiment of the present invention taken along a section line 6—6 in FIG. 5.

As seen in FIGS. 5 and 6, the roof ditch molding 10 preferably comprises a rigid carrier member 11 and a resilient cover member 12. The carrier member 11 is preferably formed with a rigid material such as steel or aluminum to ensure the stiffness of the roof ditch molding 10 and to control the shrinkage of the roof ditch molding 10. The carrier member 11 preferably extends for a substantially entire length of the roof ditch molding 10 in the longitudinal direction (i.e., from the lower portion of the front pillar 20 along the roof body member 30 to the lower portion of the rear pillar 40).

The carrier member 11 preferably has a substantially C-shape cross section with first and second free ends 11a and 11b, first and second curved portions 11c and 11d, and a center portion 11e as seen in FIG. 6. The first and second free ends 11a and 11b preferably extend substantially toward each other. The first and second curved portions 11c and 11d are integrally formed with the first and second free ends 11a and 11b, and extend from the first and second free ends 11a and 11b. The center portion 1e extends between the first and second curved portions 11c and 1d. Moreover, the carrier member 11 includes a step portion 11f between the first free end 11a and the first curved portion 11c such that the first free end 11a is downwardly offset from one end of the first curved portion 11c that is adjacent to the step portion 11f. In the present invention, the stiffness of the roof ditch molding 10 is ensured by providing the step portion 1 if to the carrier member 11 while the overall size of the carrier member 11 is maintained relatively smaller. Thus, the weight and cost of the roof ditch molding 10 can be reduced while the stiffness of the roof ditch molding 10 is maintained.

The cover member 12 of the roof ditch molding 10 is preferably formed with a resilient material such as PVC or the like to cover an outer surface of the carrier member 11. The cover member 12 preferably includes a first lip portion 12a and a second lip portion 12b that extend from the first free end 11a and the second free end 11b of the carrier member 11, respectively. In the preferred embodiment of the present invention, the first lip portion 12a extends substantially perpendicular to the first free end 11a in a downward direction. The first lip portions 12a and the second lip portions 12b are configured and arranged to elastically abut against the roof body member 30 within the drainage groove to form seals between the roof ditch molding 10 and the roof body member 30 when the roof ditch molding is coupled to the roof body member 30, as discussed in more detail below.

As seen in FIGS. 3 and 4, the roof ditch molding 10 is preferably fixedly coupled within the drainage groove G formed in the roof body member 30 by at least one fastener unit comprising a roof side molding clip 70 and a roof side molding fastener 80. More specifically, the roof side molding clip 70 is coupled to the roof ditch molding 10 and the roof side molding fastener 80, and the roof side molding fastener 80 is preferably fixedly coupled to the roof body member 30 within the drainage groove G.

As explained above, in the preferred embodiment of the present invention, the roof ditch molding 10 is preferably coupled to the roof body member 30 at the seven roof mounting portions RF as shown in FIG. 2. In other words, the roof ditch molding 10 is preferably fixedly coupled to the roof body member 30 by using seven sets of the roof side molding clip 70 and the roof side molding fastener 80 with the roof side molding fastener 80 being preferably disposed on each of the seven roof mounting portions RF on the roof body member 30 and seven roof side molding clips 70 being preferably attached to the roof molding section of the roof ditch molding 10 in positions that match with the roof mounting portions RF.

Figure 7:
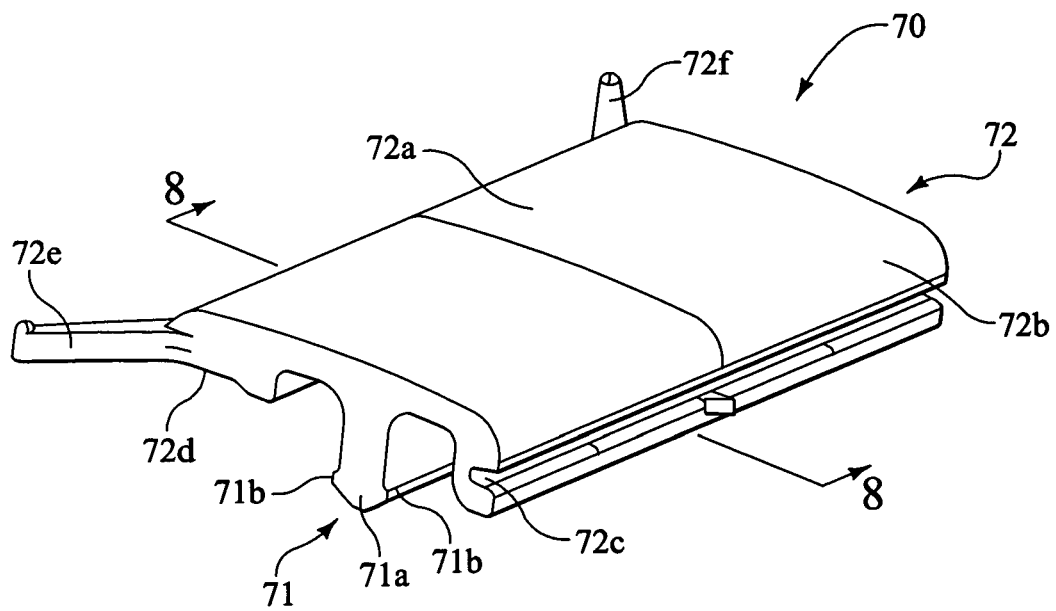
FIG. 7 is an enlarged perspective view of the roof side molding clip of the roof ditch molding structure in accordance with the preferred embodiment of the present invention.
Figure 8:
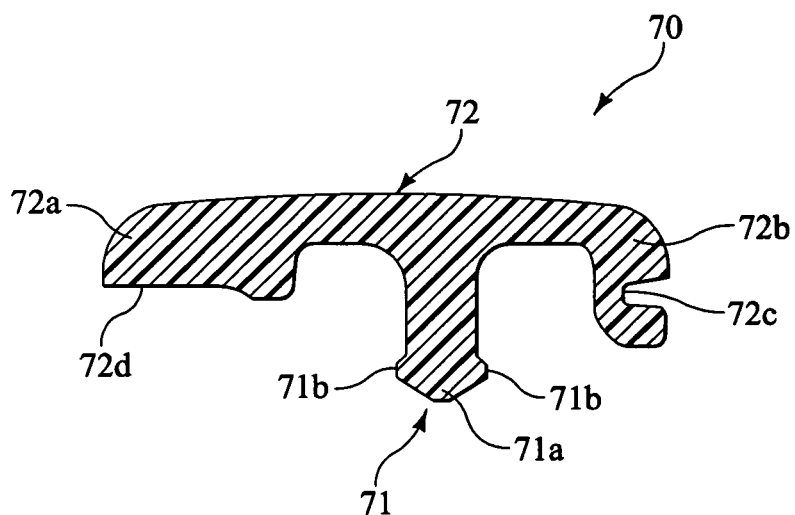
FIG. 8 is an enlarged cross sectional view of the roof side molding clip of the roof ditch molding structure in accordance with the preferred embodiment of the present invention taken along a section line 8—8 in FIG. 7.

As seen in FIGS. 7 and 8, the roof side molding clip 70 is preferably formed with a rigid material such as synthetic resin and has a substantially T-shape cross section that includes an anchor shaped hook portion 71 and a molding supporting portion 72 that is integrally formed with the hook portion 71. The hook portion 71 extends generally downwardly and includes a free end 71a with a pair of claws 71b for engaging with the roof side molding fastener 80. The molding supporting portion 72 is configured and arranged to be rigidly coupled to the roof ditch molding 10. More specifically, the molding supporting portion 72 includes a first lateral end portion 72a that extends substantially perpendicular to the hook portion 71, and a second lateral end portion 72b that extends substantially perpendicular to the hook portion 71 in a direction opposite to the first lateral end portion 72a. A longitudinal slot 72c is preferably formed in the second lateral end portion 72b for receiving the second free end 11b of the carrier member 11 of the roof ditch molding 10 as seen in FIG. 4. The first lateral end portion 72a includes a clip abutment surface 72d disposed on a bottom end of the first lateral end portion 72a. The clip abutment surface 72d is configured and arranged to abuts against an inner surface of the carrier member 11 adjacent to the first curved portion 11c of the carrier member 11 when the roof ditch molding 10 is coupled to the roof side molding clip 70. Moreover, the first lateral end portion 72a of the molding supporting portion 72 preferably includes a pair of supporting beams 72e and 72f that extends outwardly from longitudinal edges of the first lateral end portion 72a. The supporting beams 72e and 72f are preferably configured and arranged to resiliently abut against an inner surface of the first curved portion 11c of the carrier member 11 when the roof ditch molding 10 is coupled to the roof side molding clip 70. Accordingly, the molding supporting portion 72 of the roof side molding clip 70 is rigidly coupled to the roof ditch molding 10.

Figure 9:
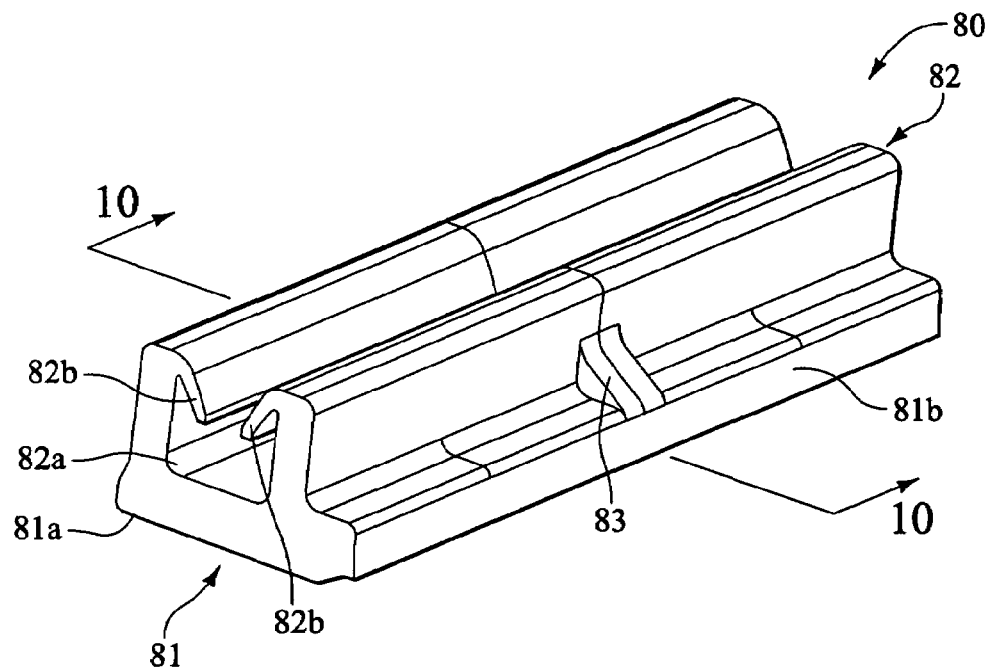
FIG. 9 is an enlarged perspective view of the roof side molding fastener of the roof ditch molding structure in accordance with the preferred embodiment of the present invention.
Figure 10:
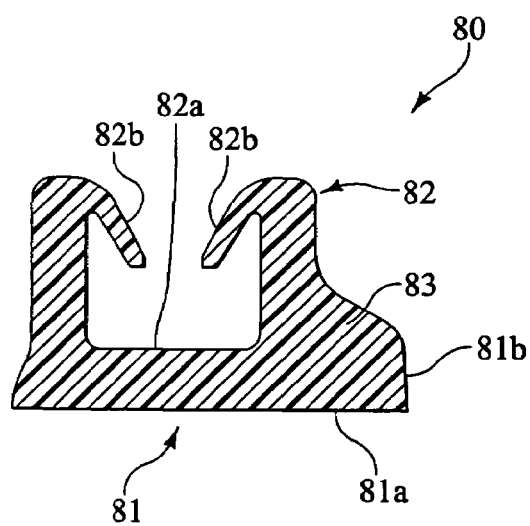
FIG. 10 is an enlarged cross sectional view of the roof side molding fastener of the roof ditch molding structure in accordance with the preferred embodiment of the present invention taken along a section line 10—10 in FIG. 9.

As seen in FIGS. 9 and 10, the roof side molding fastener 80 is preferably formed with a rigid material such as synthetic resin and has a generally U-shape cross section that comprises a base portion 81 and a molding retaining portion 82 integrally formed with the base portion 81 to extend in a generally upward direction from the base portion 81. The roof side molding fastener 80 preferably has a generally constant transverse cross section as shown in FIG. 10 except for a rib portion 83 is formed in a longitudinal center portion of one side of the roof side molding fastener 80 between the base portion 81 and the molding retaining portion 82. The base portion 81 of the roof side molding fastener 80 preferably includes a mounting surface 81a that is configured and arranged to be fixedly coupled to the roof body member 30 of the vehicle 1. More specifically, the mounting surface 81a is formed at a bottom of the base portion 81 so that the mounting surface 81a is preferably fixedly coupled to the roof edge portion 52 of the roof panel 50 by an adhesive 90 disposed therebetween as seen in FIG. 4.

In the preferred embodiment of the present invention, the adhesive 90 is preferably a thermal cure, double sided adhesive tape that is constructed urethane. Since the roof side molding fastener 80 is coupled to the roof edge portion 52 of the roof panel 50 by the adhesive 90, the use of rivet fasteners can be eliminated. Thus, a cost and time for the labor of assembling the roof ditch molding 10 can be reduced, and the water leakage at the rivet fastening portions can be avoided.

Furthermore, the base portion 81 of the roof side molding fastener 80 preferably includes an abutment surface 81b that extends substantially perpendicularly in an upward direction from the mounting surface 81a. The abutment surface 81b is disposed with respect to the mounting surface 81a so that the abutment surface 81b abuts against the first vertical wall surface 63a of the side vertical portion 63 of the side panel 60 when the mounting surface 81a is adhesively coupled to the roof edge portion 52 of the roof panel 50. In other words, the base portion 81 is configured and arranged to be disposed in the drainage groove G with two sides of the base portion 81 (i.e., the mounting surface 81a and the abutment surface 81b) being supported by the roof body member 30. Accordingly, the stiffness of the roof ditch molding 10 when the roof ditch molding 10 is coupled to the roof body member 30 is further improved.

As seen in FIGS. 9 and 10, the molding retaining portion 82 of the roof side molding fastener 80 preferably includes a clip retaining bore 82a in a center portion of the molding retaining portion 82 with an upper open end that extends in a longitudinal direction of the roof side molding fastener 80. Moreover, the molding retaining portion 82 preferably includes a pair of flanges 82b that extend from transverse edges of the clip retaining bore 82a toward a center portion of the clip retaining bore 82a. Thus, the free end 71a of the hook portion 71 of the roof side molding clip 70 is inserted into the clip retaining bore 82a of the roof side molding fastener 80 from the upper open end. The flanges 82b of the molding retaining portion 82 prevent the roof side molding clip 70 being detached from the roof side molding fastener 80 by engaging with the claws 71b formed in the free end 71a of the hook portion 71 of the roof side molding clip 70. Accordingly, in each one of the roof mounting portions RF, the roof ditch molding 10 is fixedly coupled to the roof body member 30 of the vehicle 1 by the roof side molding clip 70 and the roof side molding fastener 80.

As seen in FIG. 4, when the roof ditch molding 10 is coupled to the roof body member 30, the first lip portion 12a of the cover member 12 of the roof ditch molding 10 resiliently abuts against the roof edge portion 52 of the roof panel 50 to form a seal between the roof ditch molding 10 and the roof panel 50. The second lip portion 12b of the cover member 12 preferably resiliently abuts against the second vertical wall surface 63b of the vertical portion 63 of the side panel 60 to form a seal between the roof ditch molding 10 and the side panel 60. Thus, the roof side molding clip 70 and the roof side molding fastener 80 are disposed in a substantially enclosed area formed between the roof ditch molding 10 and the roof body member 30 as seen in FIG. 4.

Moreover, as explained above and seen in FIG. 4, the water management channel W is formed that extends in a longitudinal direction on the roof of the vehicle 1 when the roof ditch molding 10 is coupled to the roof body member 30. More specifically, the water management channel W is formed on the roof edge portion 52 of the roof panel 50 between the first lip portion 12a of the cover member 12 of the roof ditch molding 10 and the vertical portion 53 of the roof panel 50 with the water inlet slit S being formed between the first curved portion 11c of the carrier member 11 of the roof ditch molding 10 and an upper portion of the vertical portion 53 of the roof panel 50. The roof vertical portion 53 and the roof edge portion 52 of the roof panel 50 and the first lip portion 12a and the first curved portion 11c of the roof ditch molding 10 are preferably arranged to form a approximately 330 degree arc shape wall of the water management channel W so that the flow of water is substantially constrained within the water management channel W.

Moreover, the roof ditch molding 10 and the roof panel 50 are preferably arranged such that the first curved portion 11c of the carrier member 11 is disposed above the roof vertical portion 53 of the roof panel 50 as the first curved portion 11c and the roof vertical portion 53 having an overlap in a vertical direction of the vehicle 1. With this arrangement, the potential for water to flow outside of the designated water management area (the water management channel W) is reduced, and the water on the roof main portion 51 of the roof panel 50 is reliably guided into the water management channel W through the water inlet slit S.

As explained above, the water guided into the water management channel W is drained toward the lower portion of the front pillar 20 along the pillar molding section of the roof ditch molding 10 that extends substantially parallel to the front pillar 20. The water in the water management channel W is also drained toward the lower portion of the rear pillar 40 along the rear pillar molding section of the roof ditch molding 10 that extends substantially parallel to the rear pillar 40. In the preferred embodiment of the present invention, the roof ditch molding structure that is used to couple the roof ditch molding 10 to the rear pillar 40 in each of the rear pillar mounting portions RP is substantially identical to the roof ditch molding structure used to couple the roof ditch molding 10 to the front pillar 20 in each of the front pillar mounting portions FP except for that they are the mirror images of the each other. Thus, only the roof ditch molding structure used to couple the roof ditch molding 10 to the front pillar 20 will be discussed and/or illustrated in detail herein.

Figure 11:
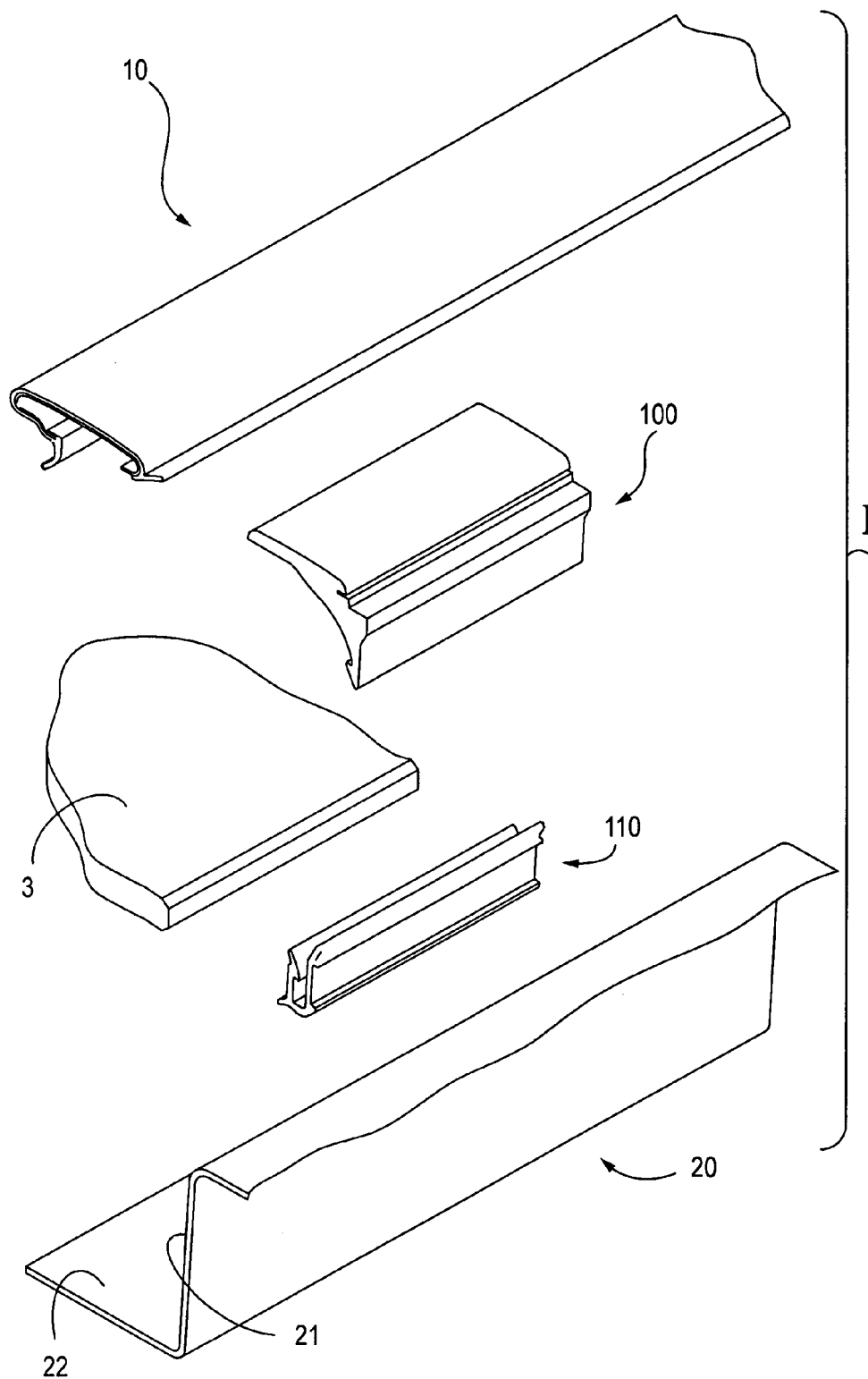
FIG. 11 is an enlarged exploded view of the roof ditch molding structure at a pillar portion of the vehicle including a pillar side molding clip and a pillar side molding fastener in accordance with the preferred embodiment of the present invention.

FIGS. 10 and 11 shows the roof ditch molding structure used in one of the mounting portions FP for coupling the front pillar molding section of the roof ditch molding 10 to the front pillar 20. As explained above, the roof ditch molding 10 has a substantially constant transverse cross section throughout the roof molding section, the front pillar molding section, and the rear pillar molding section. In other words, the front pillar molding section of the roof ditch molding 10 comprises the carrier member 11 and the cover member 12 as shown in FIGS. 5 and 6.

Figure 12:
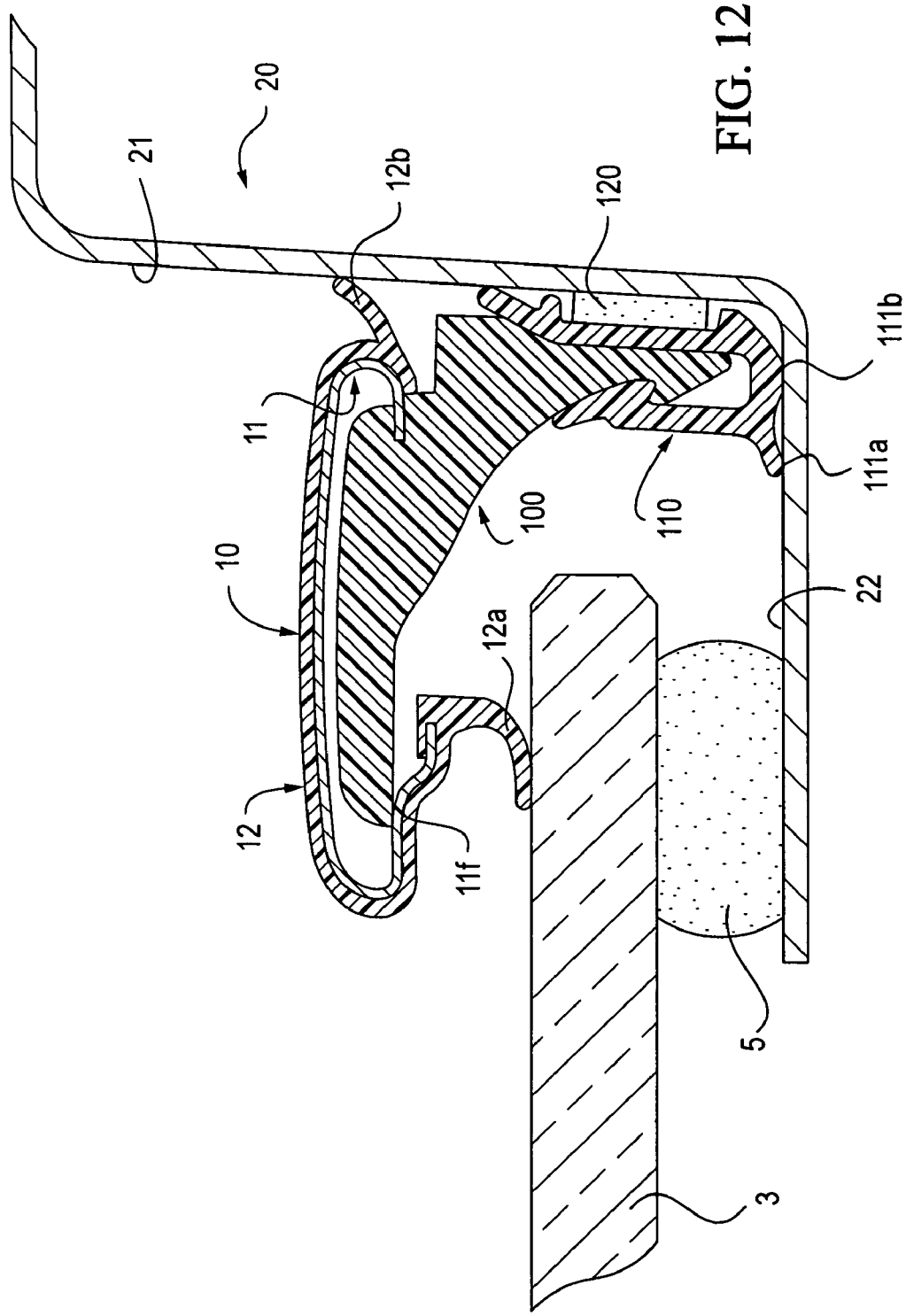
FIG. 12 is a cross sectional view of the roof ditch molding structure at the pillar portion of the vehicle taken along a section line 12—12 in FIG. 1 in accordance with the preferred embodiment of the present invention.

As seen in FIG. 2, the front pillar 20 is preferably integrally formed with the side panel 60. The front pillar 20 preferably includes an inner side surface 21 and an inner bottom surface 22. The inner side surface 21 is preferably disposed on a plane that extends in a generally vertical direction of the vehicle 1, and the inner bottom surface 22 extends substantially perpendicularly from a lower end of the inner side surface 21 toward an inner portion of the vehicle 1. As seen in FIGS. 11 and 12, the inner bottom surface 22 is configured and arranged to support a lateral end portion of a windshield 3 with a glass adhesive 5 such as a urethane adhesive disposed therebetween.

The roof ditch molding 10 is preferably disposed with respect to the front pillar 20 to substantially cover a coupling portion between the front pillar 20 and the windshield 3. Moreover, the roof ditch molding 10 is preferably fixedly coupled to the front pillar 20 such that the first lip portion 12a of the cover member 12 of the roof ditch molding 10 elastically abuts against an upper surface of the windshield 3 to form a seal between the roof ditch molding 10 and the windshield 3. Also, the second lip portion 12b of the cover member 12 of the roof ditch molding 10 preferably elastically abuts against the inner side surface 21 of the front pillar 20 to from a seal between the front pillar 20 and the roof ditch molding 10.

As seen in FIGS. 11 and 12, the roof ditch molding 10 is preferably fixedly coupled to the front pillar 10 by at least one pillar fastener unit comprising a pillar side molding clip 100 and a pillar side molding fastener 110. The pillar side molding clip 100 is preferably coupled to the roof ditch molding 10 and to the pillar side molding fastener 110, and the pillar side molding fastener is preferably fixedly coupled to the front pillar 20. As explained above, in the preferred embodiment of the present invention, the roof ditch molding 10 is preferably coupled to the front pillar 20 at the five front pillar mounting portions FP as shown in FIG. 2. In other words, the roof ditch molding 10 is preferably coupled to the front pillar 20 by using five sets of the pillar side molding clip 100 and the pillar side molding fastener 110 as the pillar side molding fastener 110 being preferably disposed on each of the five mounting portions FP on the front pillar 20 and five pillar side molding clips 100 being preferably attached to the front pillar molding section of the roof ditch molding 10 in positions that substantially match with the front pillar mounting portions FP. Similarly, the roof ditch molding 10 is preferably coupled to the rear pillar 40 at the three rear pillar mounting portions RP as shown in FIG. 2. In other words, the roof ditch molding 10 is preferably coupled to the rear pillar 40 by using three sets of the pillar side molding clip 100 and the pillar side molding fastener 110 as the pillar side molding fastener 110 being preferably disposed on each of the three mounting portions RP on the rear pillar 40 and three pillar side molding clips 100 being preferably attached to the rear pillar molding section of the roof ditch molding 10 in positions that substantially match with the rear pillar mounting portions RP.

Figure 13:
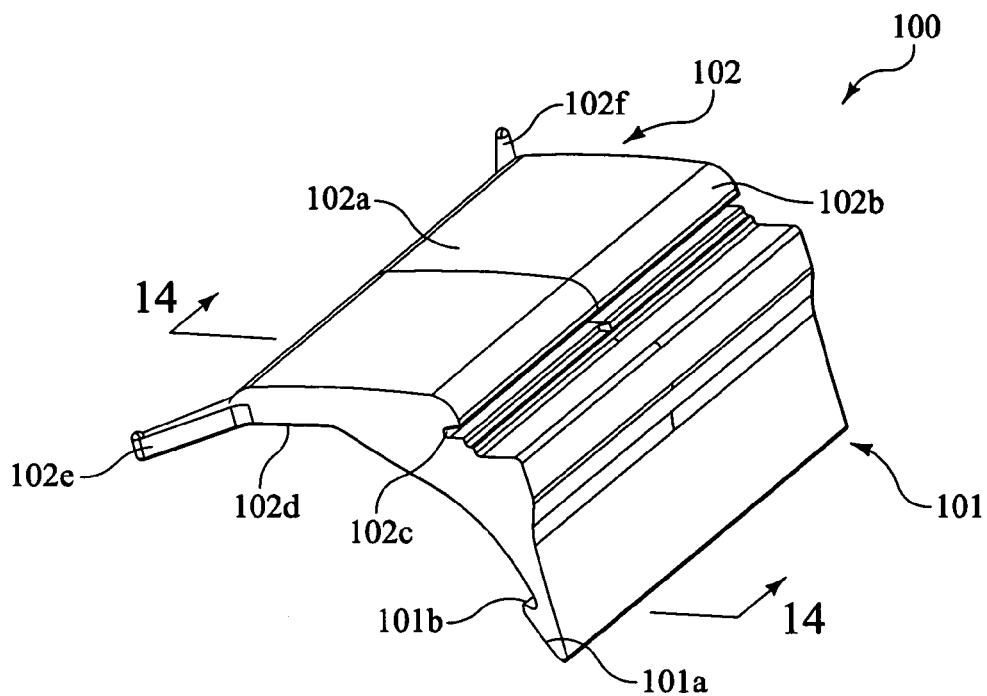
FIG. 13 is an enlarged perspective view of the pillar side molding clip of the roof ditch molding structure in accordance with the preferred embodiment of the present invention.
Figure 14:
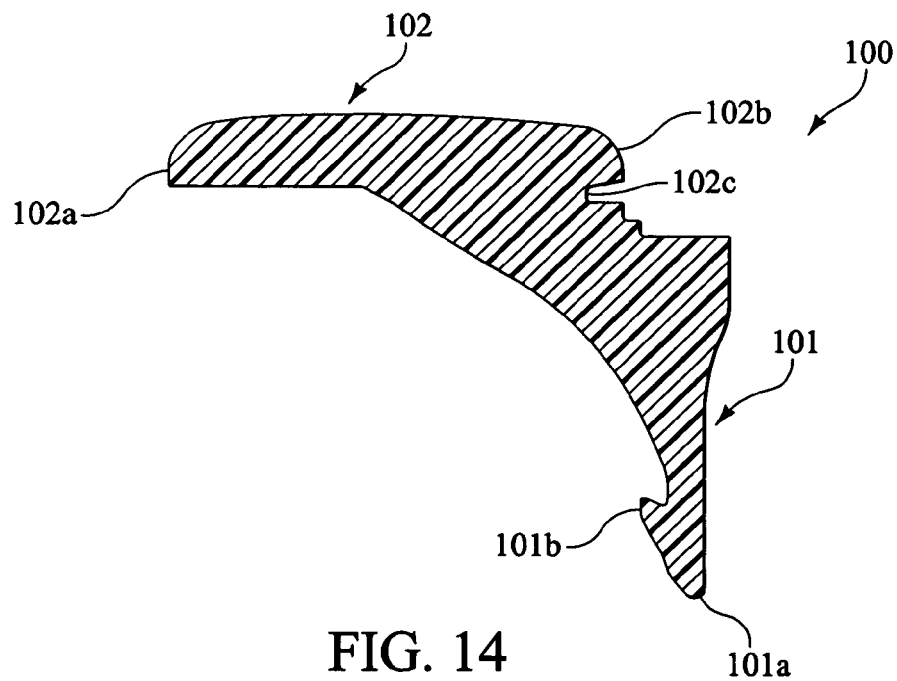
FIG. 14 is an enlarged cross sectional view of the pillar side molding clip of the roof ditch molding structure in accordance with the preferred embodiment of the present invention taken along a section line 14—14 in FIG. 13.

As seen in FIGS. 13 and 14, the pillar side molding clip 100 is preferably formed with a rigid material such as synthetic resin and has a generally L-shape cross section that includes a hook portion 101 and a molding supporting portion 102 extending substantially perpendicular to the hook portion 101. The hook portion 101 extends generally downwardly and includes a free end 101a with a claw 101b for engaging with the pillar side molding fastener 110. The molding supporting portion 102 is configured and arranged to be rigidly coupled to the roof ditch molding 10. More specifically, the molding supporting portion 102 includes a first lateral end portion 102a that extends substantially perpendicular to the hook portion 101, and a second lateral end portion 102b that is disposed adjacent to the hook portion 101. A longitudinal slot 102c is preferably formed in the second lateral end portion 102b for receiving the second free end 11b of the carrier member 11 of the roof ditch molding 10 as seen in FIG. 12. The first lateral end portion 102a includes a clip abutment surface 102d disposed on a bottom end of the first lateral end portion 102a. The clip abutment surface 102d is preferably configured and arranged to abut against an inner surface of the carrier member 11 adjacent to the first curved portion 11c of the carrier member 11 when the roof ditch molding 10 is coupled to the pillar side molding clip 100. Moreover, the first lateral end portion 102a of the molding supporting portion 102 preferably includes a pair of supporting beams 102e and 102f that extends outwardly from longitudinal edges of the first lateral end portion 102a. The supporting beams 102e and 102f are preferably configured and arranged to resiliently abut against an inner surface of the first curved portion 11c of the carrier member 11 when the roof ditch molding 10 is coupled to the pillar side molding clip 100. Accordingly, the molding supporting portion 102 of the pillar side molding clip 100 is rigidly coupled to the roof ditch molding 10.

Figure 15:
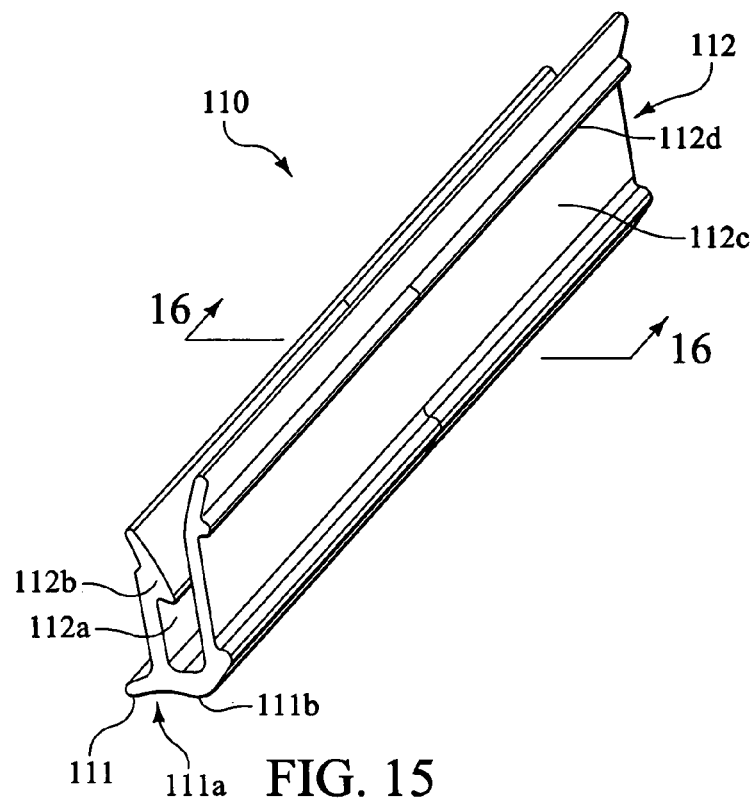
FIG. 15 is an enlarged perspective view of the pillar side molding fastener of the roof ditch molding structure in accordance with the preferred embodiment of the present invention.
Figure 16:
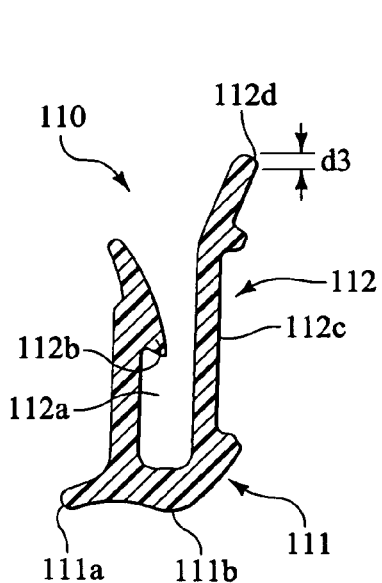
FIG. 16 is an enlarged cross sectional view of the pillar side molding fastener of the roof ditch molding structure in accordance with the preferred embodiment of the present invention taken along a section line 16—16 in FIG. 15.
Figure 17:
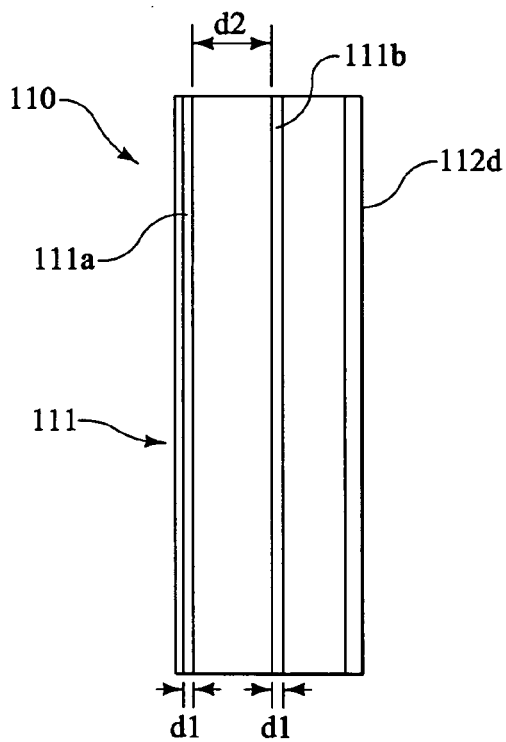
FIG. 17 is an enlarged bottom plan view of the pillar side molding fastener of the roof ditch molding structure in accordance with the preferred embodiment of the present invention.

As seen in FIGS. 15 to 17, the pillar side molding fastener 110 is preferably formed with a rigid material such as synthetic resin and has a generally U-shape cross section that comprises a base portion 111 and a molding retaining portion 112 integrally formed with the base portion to extend in a generally upward direction from the base portion 111. The pillar side molding fastener 110 preferably has a substantially constant transverse cross section as shown in FIG. 16. Therefore, the pillar side molding fastener 110 can be manufactured by an extrusion process, and thus, the production time and cost can be reduced. The base portion 111 of the pillar side molding fastener 110 preferably includes a first longitudinal contacting surface 111a, and a second longitudinal contacting surface 111b on a bottom side of the base portion 111. The first longitudinal contacting surface 111a preferably extends for substantially entire longitudinal length of the pillar side molding fastener 110. The second longitudinal contacting surface 111b preferably extends substantially parallel to the first longitudinal contacting surface 111a, and laterally spaced from the first longitudinal contacting surface 111a to form an uninterrupted air space between the first and second longitudinal contacting surfaces 111a and 111b as seen in FIG. 16. The first and second longitudinal contacting surfaces 111a and 111b are preferably configured and arranged to have substantially small transverse widths d1 (e.g., approximately 0.3 mm) with respect to the transverse width of the base portion 111. Moreover, the first and second longitudinal contacting surfaces 111a and 111b are spaced apart from each other by at least a prescribed distance d2 (e.g., approximately 3 mm). In the preferred embodiment of the present invention, the first and second longitudinal contacting surfaces 111a and 111b are preferably configured and arranged to be disposed on a single plane such that the first and second longitudinal contacting surfaces 111a and 111b are disposed on the inner bottom surface 22 of the front pillar 20 when the pillar side molding fastener 110 is coupled to the front pillar 20. Thus, the pillar side molding fastener 110 can be properly located on the front pillar 20 in a vertical direction of the pillar side molding fastener 110 without an additional assembly fixture as the first and second longitudinal contacting surfaces 111a and 111b abutting against the inner bottom surface 22 of the front pillar 20. An area of the base portion 111 of the pillar side molding fastener 110 that contacts with the inner bottom surface 22 of the front pillar 20 is minimized by setting the transverse widths d1 of the first and second longitudinal contacting surfaces 111a and 111b substantially small, and forming the uninterrupted air space between the first and second longitudinal contacting surfaces 111a and 111b. Thus, a fretting corrosion that is caused by the vibration between contacting surfaces of the pillar side molding fattener 110 and the front pillar 20 is prevented. Moreover, corrosion between the pillar side molding fastener 110 and the inner bottom surface 22 of the front pillar 20 is prevented from occurring even when the water enters in the region between the roof ditch molding 10 and the front pillar 20.

The molding retaining portion 112 of the pillar side molding fastener 110 preferably includes a clip retaining bore 112a in a center portion of the molding retaining portion 112 that extends in a longitudinal direction of the pillar side molding fastener 110 as seen in FIG. 16. Moreover, the molding retaining portion 112 preferably includes a flange 112b that extends from a transverse edge of the clip retaining bore 112a toward a center portion of the clip retaining bore 112a. Thus, the free end 101a of the hook portion 101 of the pillar side molding clip 100 is inserted into the clip retaining bore 112a of the pillar side molding fastener 110. The flange 112b of the molding retaining portion 112 prevents the pillar side molding clip 100 being detached from the pillar side molding fastener 110 by engaging with the claw 101b formed in the free end 101a of the hook portion 101 of the pillar side molding clip 100.

Moreover, as seen in FIG. 16, the molding retaining portion 112 of the pillar side molding fastener 110 preferably includes a mounting surface 112c that is configured and arranged to be fixedly coupled to the front pillar 20. More specifically, the mounting surface 112c of the molding retaining portion 112 of the pillar side molding fastener 110 is preferably fixedly coupled to the inner side surface 21 of the front pillar 20 by an adhesive 120 disposed therebetween as seen in FIG. 12. In the preferred embodiment of the present invention, the adhesive 120 is preferably a thermal cure, double sided adhesive tape that is formed of urethane. Since the pillar side molding fastener 110 is coupled to the inner side surface 21 of the front pillar 20 by the adhesive 120, the use of rivet fasteners can be eliminated. Thus, a cost and time for the labor of assembling the roof ditch molding 10 can be reduced, and the water leakage at the rivet fastening portions can be avoided.

Furthermore, the molding retaining portion 112 of the pillar side molding fastener 110 preferably includes a third longitudinal contacting surface 112d that extends substantially an entire longitudinal length of the pillar side molding fastener 110 as seen in FIGS. 15 and 16. The third longitudinal contacting surface 112d is disposed with respect to the mounting surface 121c so that the third longitudinal contacting surface 112d abuts against the inner side surface 21 of the front pillar 20 when the mounting surface 111a is adhesively coupled to the inner side surface 21 of the front pillar 20. Thus, the pillar side molding fastener 110 can be properly positioned on the front pillar 20 with respect to the transverse direction of the pillar side molding fastener 110 as the third longitudinal contacting surface 112d abutting against the inner side surface 21 of the front pillar 20 when the pillar side molding fastener 110 is coupled to the front pillar 20. Similarly to the first and second longitudinal contacting surfaces 111a and 111b, the third longitudinal contacting surface 112d preferably has a substantially small transverse width d3 to minimize a contacting area between the pillar side molding fastener 110 and the inner side surface 21 of the front pillar 20. Thus, the fretting corrosion between the pillar side molding fastener 110 and the inner side surface 21 of the front pillar 20 can be prevented from occurring. Therefore, the roof ditch molding 10 is properly positioned with respect to the front pillar 20 in the transverse direction and in the vertical direction, and fixedly coupled to the front pillar 20 by using the pillar side molding clip 100 and the pillar side molding fastener 110.

Figure 18:
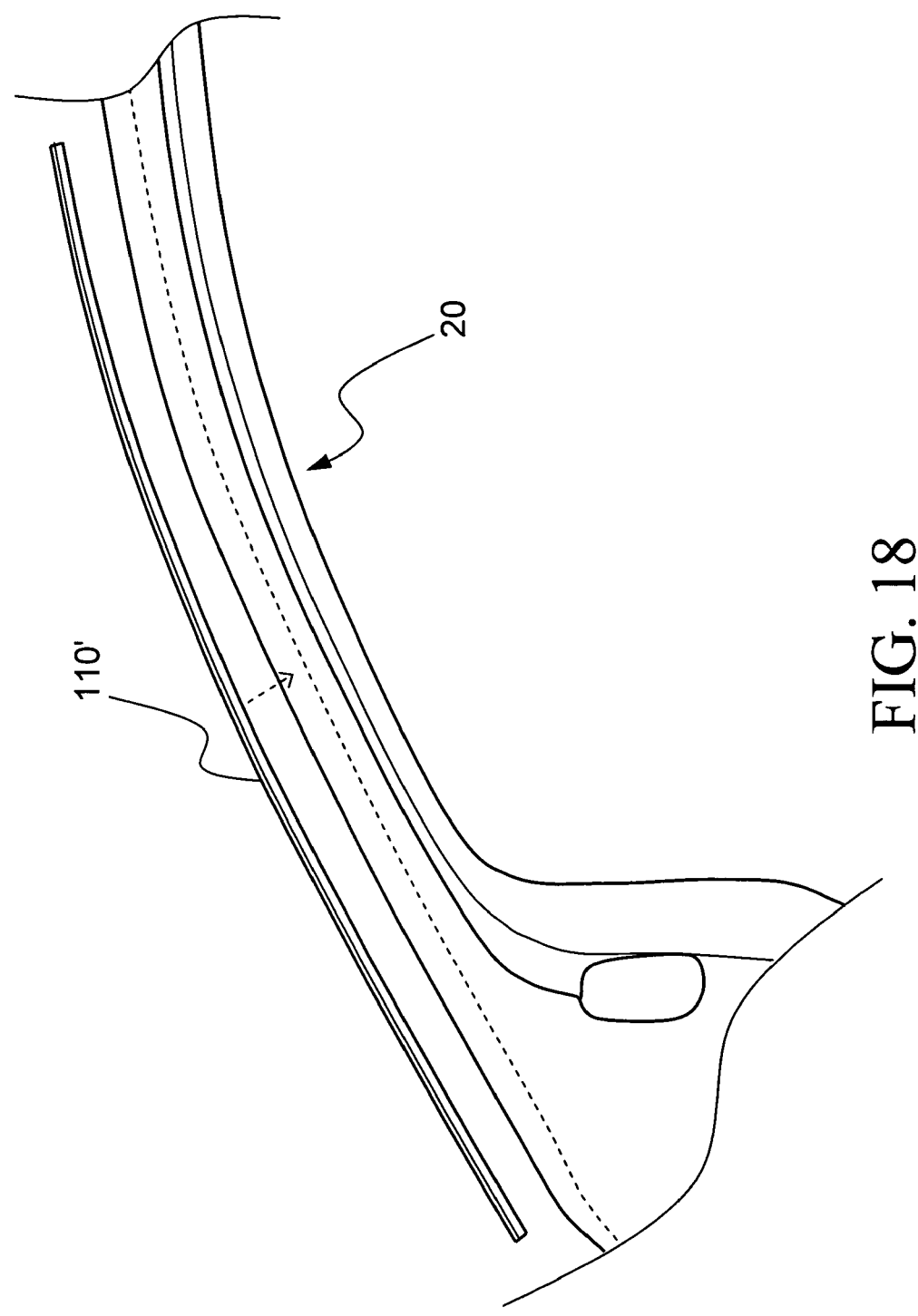
FIG. 18 is an enlarged side elevational view illustrating the pillar portion of the vehicle and a modified pillar side molding fastener in accordance with the preferred embodiment of the present invention.

Alternatively, a modified pillar side molding fastener 110' as shown in FIG. 18 can also be utilized instead of a plurality of pillar side molding fasteners 110 to carry out the roof ditch molding structure of the present invention. The modified pillar side molding fastener 110' is basically identical to the pillar side molding fastener 110, except for the longitudinal length of the modified pillar side molding fastener is substantially extended such that the modified pillar side molding fastener 110' extends for a majority of a length of the front pillar 20 as seen in FIG. 18. In other words, the modified pillar side molding fastener 110' has a substantially constant transverse cross sectional shape that is identical to the cross section of the pillar side molding fastener as shown in FIG. 16, and includes the first, second and third longitudinal contacting surfaces 11a, 111b and 112d as explained above. Thus, the modified pillar side molding fastener 110' can be accurately located on the front pillar 20 in the vertical and horizontal directions by using the first, second and third longitudinal contacting surfaces 11a, 111b and 112d. Since the roof ditch molding 10 is coupled to the front pillar 20 by using a single modified pillar side molding fastener 110', the assembly process of the roof ditch molding 10 and the front pillar 20 can be simplified, and thus, the time and cost of the labor can be reduced.

As explained above, both of the pillar side molding fastener 110 and the modified pillar side molding fastener 110' have the substantially constant transverse cross section shown in FIG. 16, and thus, can be manufactured by the extruded process. Thus, one of the pillar side molding fastener 110 and the modified pillar side molding fastener 110' that is more suitable to a particular manufacturing considerations (design, structure, cost, etc.) of the vehicle 1 can be selected to be used in the roof ditch molding structure of the present invention. As the pillar side molding fastener 110, the modified pillar side molding fastener 110' can be utilized in the rear pillar 40. In such a case, the modified roof ditch molding structure 110' is preferably configured and arranged to have a longitudinal length that extends substantially a majority of a longitudinal length of the rear pillar 40.

Accordingly, the present invention provides an improved water management performance by controlling the flow of water along the surface of the vehicle 1. More specifically, in the roof ditch molding structure of the present invention, the water in the roof main portion 51 of the roof panel 50 is efficiently guided into the water management channel W formed by the roof ditch molding 10 and the roof body member 30, and drained along the roof ditch molding 10 (e.g., along the lip portion 12a of the roof ditch molding 10) extending along the front pillar 20 and the rear pillar 40. Moreover, the external appearance of the vehicle 1 is improved by providing the roof ditch molding 10 that extends from the lower portion of the front pillar 20 to the roof body member 30 and to the lower portion of the rear pillar 40.

Also, the roof ditch molding structure of the present invention provides an improved stiffness of the roof ditch molding 10 by forming the step portion 11f in the carrier member 11 of the roof ditch molding 10. Furthermore, in the roof portion of the vehicle 1, since the side panel 60 of the roof body member 30 is provided with the step structure such that the roof side pillar fastener 80 is supported by the roof body member 30 at two sides (i.e., the mounting surface 81a and the abutment surface 81b), the stiffness of the roof ditch molding 10 is further improved.

Furthermore, the roof ditch molding structure of the present invention prevents the water leakage in the vehicle 1 by eliminating the use of rivet fasteners. Since the roof side molding fastener 80 and the pillar side molding fastener 110 are both fixedly coupled to the roof body member 30 and the front pillar 20 or the rear pillar 40, respectively, by the adhesives 90 and 120, respectively, the water leakage problem can be avoided.

Also, the pillar side molding fastener 110 is accurately located on the front pillar 20 or the rear pillar 40 in the transverse direction and the vertical direction without using an additional assembly fixture. The first and second longitudinal contacting surfaces 111a and 111b assist accurately locating the pillar side molding fastener 110 on the front pillar 20 or the rear pillar 40 in the vertical direction while the third longitudinal contacting surface 112d assists accurately locating the pillar side molding fastener 110 on the front pillar 20 or the rear pillar 40 in the horizontal direction of the vehicle 1. Thus, the time and cost required to assemble the roof ditch molding 10 to the vehicle 1 can be reduced. As explained above, the first and second longitudinal contacting surfaces 11a and 111b are configured and arranged to have a substantially small transverse widths d1 and an interrupted air space is formed between the first and second longitudinal contacting surfaces 111a and 111b. Also, the third longitudinal contacting surface 112d is configured and arranged to have a substantially small transverse width d3 to minimize a contacting area between the pillar side molding fastener 110 and the front pillar 20 or the rear pillar 40. Therefore, the fretting corrosion caused by the vibration between the pillar side molding fastener 110 and the front pillar 20 or the rear pillar 40 or the corrosion caused by water leaking into the area between the roof ditch molding 10 and the front pillar 20 or the rear pillar 40 can be prevented from occurring while the pillar side molding fastener 110 is steadily supported by the front pillar 20 or the rear pillar 40.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A molding fastener comprising:
   a molding retaining portion configured and arranged to releasably retain a roof ditch molding to a vehicle body; and
   a base portion coupled to the molding retaining portion on a first side of the base portion and a second side of the base portion including
   a first longitudinal contacting surface, and
   a second longitudinal contacting surface extending substantially parallel to the first longitudinal contacting surface, and laterally spaced from the first longitudinal contacting surface to form an uninterrupted air space between the first and second longitudinal contacting surfaces with the uninterrupted air space including an elongated recess that does not extend through the base portion between the first and second sides of the base portion.

2. The molding fastener as recited in claim 1, wherein the first and second longitudinal contacting surfaces of the base portion are disposed on a single plane.

3. The molding fastener as recited in claim 1, wherein the second longitudinal contacting surface of the base portion is disposed between the first longitudinal contacting surface of the base portion and a mounting surface of the molding retaining portion that extends generally perpendicular to the base portion.

4. The molding fastener as recited in claim 3, wherein the first longitudinal contacting surface of the base portion is disposed at a first transverse edge section of the base portion, and the second longitudinal contacting surface of the base portion is disposed at a second transverse edge section of the base portion.

5. The molding fastener as recited in claim 4, wherein
the first and second longitudinal contacting surfaces extend throughout a longitudinal length of the base portion.

6. The molding fastener as recited in claim 5, wherein
the first and second longitudinal contacting surfaces are substantially elongated surfaces with prescribed transverse widths that are substantially smaller with respect to a transverse width of the base portion.

7. The molding fastener as recited in claim 6, wherein
the prescribed transverse widths of the first and second longitudinal contacting surfaces are approximately 0.3 mm.

8. The molding fastener as recited in claim 7, wherein
the first and second longitudinal contacting surfaces are spaced apart in the transverse direction of the base portion by approximately 3 mm.

9. A molding fastener comprising:
a molding retaining portion configured and arranged to releasably retain a roof ditch molding to a vehicle body; and
a base portion including
 a first longitudinal contacting surface, and
 a second longitudinal contacting surface extending substantially parallel to the first longitudinal contacting surface, and laterally spaced from the first longitudinal contacting surface to form an uninterrupted air space between the first and second longitudinal contacting surfaces,
the molding retaining portion including a third longitudinal contacting surface that is disposed on a plane substantially orthogonal to the first and second longitudinal surfaces such that the second longitudinal contacting surface is disposed between the first and third longitudinal contacting surfaces in a transverse direction.

10. A molding fastener comprising:
a molding retaining portion configured and arranged to releasably retain a roof ditch molding to a vehicle body; and
a base portion including
 a first longitudinal contacting surface, and
 a second longitudinal contacting surface extending substantially parallel to the first longitudinal contacting surface, and laterally spaced from the first longitudinal contacting surface to form an uninterrupted air space between the first and second longitudinal contacting surfaces,
the base portion and the molding retaining portion being integrally formed as a unitary, one-piece member.

11. A molding fastener comprising:
a molding retaining portion configured and arranged to releasably retain a roof ditch molding to a vehicle body;
a base portion including
 a first longitudinal contacting surface, and
 a second longitudinal contacting surface extending substantially parallel to the first longitudinal contacting surface, and laterally spaced from the first longitudinal contacting surface to form an uninterrupted air space between the first and second longitudinal contacting surfaces; and
an adhesive applied on a mounting surface of the molding retaining portion that extends generally perpendicular to the base portion configured and arranged to fixedly couple the molding fastener to the vehicle body.

12. The molding fastener as recited in claim 10, wherein
the adhesive is a thermal cure tape.

13. The roof ditch molding structure as recited in claim 10, wherein
the adhesive is a double sided tape.

14. The roof ditch molding structure as recited in claim 10, wherein
the adhesive is formed of urethane.

15. The roof ditch molding structure as recited in claim 10, wherein
the adhesive is a double sided tape formed of thermally cured urethane.

16. A molding fastener comprising:
a molding retaining portion configured and arranged to releasably retain a roof ditch molding to a vehicle body; and
a base portion including
 a first longitudinal contacting surface, and
 a second longitudinal contacting surface extending substantially parallel to the first longitudinal contacting surface, and laterally spaced from the first longitudinal contacting surface to form an uninterrupted air space between the first and second longitudinal contacting surfaces,
the base portion and the molding retaining portion having substantially uniform transverse cross sections.

17. A molding fastener comprising:
a molding retaining portion configured and arranged to releasably retain a roof ditch molding to a vehicle body; and
a base portion including
 a first longitudinal contacting surface, and
 a second longitudinal contacting surface extending substantially parallel to the first longitudinal contacting surface, and laterally spaced from the first longitudinal contacting surface to form an uninterrupted air space between the first and second longitudinal contacting surfaces,
the molding retaining portion including a slot that extends substantially perpendicular to the base portion configured and arranged to retain a portion of the roof ditch molding.

18. A roof ditch molding structure comprising:
a first pillar member extending in a generally vertical direction of a vehicle including an inner side surface and an inner bottom surface that extends substantially perpendicular to the inner side surface;
a roof ditch molding having a first pillar molding section extending substantially parallel to the first pillar member;
at least one pillar side molding clip having a hook portion and a molding supporting portion for rigidly holding the roof ditch molding; and
at least one pillar side molding fastener fixedly coupled to the first pillar member, including
 a molding retaining portion releasably coupled to the hook portion of the pillar side molding clip, and
 a base portion including
  a first longitudinal contacting surface, and
  a second longitudinal contacting surface extending substantially parallel to the first longitudinal contacting surface, and laterally spaced from the first longitudinal contacting surface to form an uninterrupted air space between the first and second longitudinal contacting surfaces.

19. The roof ditch molding structure as recited in claim 18, further comprising an additional pillar side molding clip coupled to the roof ditch molding as being spaced apart from the pillar side molding clip by a prescribed distance, and an additional pillar side molding fastener fixedly coupled to the first pillar member, the additional pillar side molding fastener being spaced apart from the pillar side molding fastener so that the hook portion of the additional pillar side molding clip is coupled to the molding retaining portion of the additional pillar side molding fastener.

20. The roof ditch molding structure as recited in claim 18, wherein
the pillar side molding fastener is an elongated member that extends substantially parallel to the first pillar member throughout a majority of a longitudinal length of the first pillar member.

21. The roof ditch molding structure as recited in claim 18, wherein
the pillar side molding fastener is disposed with respect to the first pillar member such that the first and second longitudinal contacting surfaces of the base portion of the pillar side molding fastener abut against the inner bottom surface of the first pillar member.

22. The roof ditch molding structure as recited in claim 18, wherein
the molding retaining portion of the pillar side molding fastener includes a third longitudinal contacting surface that is disposed on a plane substantially orthogonal with respect to the first pillar member so that the third longitudinal contacting surface abuts against the inner side surface of the first pillar member.

23. The roof ditch molding structure as recited in claim 18, wherein
the base portion and the molding retaining portion are integrally formed as a unitary, one-piece member.

24. The roof ditch molding structure as recited in claim 18, wherein
the base portion and the molding retaining portion have substantially uniform transverse cross sections.

25. The roof ditch molding structure as recited in claim 18, wherein
the molding retaining portion of the pillar side molding fastener includes a slot configured and arranged to retain the hook portion of the roof ditch molding.

26. The roof ditch molding structure as recited in claim 18, further comprising
an adhesive disposed between the inner side surface of the first pillar member and a mounting surface of the molding retaining portion of the pillar side molding fastener that extends substantially parallel to the inner side surface of the first pillar member.

27. The roof ditch molding structure as recited in claim 26, wherein
the adhesive is a thermal cure tape.

28. The roof ditch molding structure as recited in claim 26, wherein
the adhesive is a double sided tape.

29. The roof ditch molding structure as recited in claim 26, wherein
the adhesive is formed of urethane.

30. The roof ditch molding structure as recited in claim 26, wherein
the adhesive is a double sided tape formed of thermally cured urethane.

* * * * *